United States Patent [19]
Butler et al.

[11] Patent Number: 5,419,115
[45] Date of Patent: May 30, 1995

[54] BULKHEAD AND FUEL NOZZLE GUIDE ASSEMBLY FOR AN ANNULAR COMBUSTION CHAMBER

[75] Inventors: Aaron Butler, Ledyard, Conn.; Roger J. Comeau, Ware, Mass.; Franklin J. Davis, Glastonbury, Conn.; James R. Harders, Plainsboro, N.J.; Thomas J. Malitsky, Hartford, Conn.; Randy McKinney, Ellington, Conn.; Gordon Pfeifer, Glastonbury, Conn.

[73] Assignee: United Technologies Corporation, Hartford, Conn.

[21] Appl. No.: 235,047

[22] Filed: Apr. 29, 1994

[51] Int. Cl.$^6$ .............................. F02C 7/18; F23R 3/02
[52] U.S. Cl. ................................... 60/39.36; 60/740; 60/756
[58] Field of Search ................ 60/39.31, 39.32, 39.36, 60/39.37, 740, 747, 748, 752, 754, 755, 756

[56] References Cited

U.S. PATENT DOCUMENTS

| | | | |
|---|---|---|---|
| 4,246,758 | 1/1981 | Caruel et al. | 60/747 |
| 4,870,818 | 10/1989 | Suliga | 60/756 |
| 4,914,918 | 4/1990 | Sullivan | 60/39.32 |
| 4,934,145 | 6/1990 | Zeisser | 60/740 |
| 5,117,637 | 6/1992 | Howell et al. | 60/748 |
| 5,129,231 | 7/1992 | Becker et al. | 60/754 |
| 5,222,358 | 6/1993 | Chaput et al. | 60/39.32 |
| 5,253,471 | 10/1993 | Richardson | 60/39.36 |
| 5,271,219 | 12/1993 | Richardson | 60/39.36 |
| 5,307,637 | 5/1994 | Stickles et al. | 60/756 |

*Primary Examiner*—Timothy S. Thorpe
*Attorney, Agent, or Firm*—Gene D. Fleischhauer

[57] ABSTRACT

An assembly of a bulkhead 48 and fuel nozzle guide 62 for a fuel nozzle 46 disposed in a combustion chamber 24 is disclosed. Various construction details which provide for positively cooling components of the assembly are developed. In one detailed embodiment, the nozzle fuel guide is spaced from the bulkhead to form an annular gap $G_1$ which is divided by a heat shield 72 into annular orifices 108, 112 for supplying to cooling air passages 126, 128 bounded by the heat shield 72.

10 Claims, 6 Drawing Sheets fig. 1 fig.2 fig.4A fig.5

BULKHEAD AND FUEL NOZZLE GUIDE ASSEMBLY FOR AN ANNULAR COMBUSTION CHAMBER

TECHNICAL FIELD

The present invention relates to a combustion chamber for a gas turbine engine and more particularly to a combustor bulkhead and fuel nozzle guide assembly for receiving fuel nozzles in the combustion chamber.

BACKGROUND ART

Axial flow gas turbine engines are used to power modern aircraft. These gas turbine engines typically include a compression section, a combustion section, and a turbine section. A flow path for working medium flow gases extends axially through the sections of the engine.

As the gases are flowed along the flow path, the working medium gases are compressed in the compression section. The working medium gases are flowed to the combustion section where they are mixed with fuel. The gases and fuel are burned to add energy to the gases. The gases are expanded through the turbine section to produce useful work to power the compression section and, in the case of aircraft engines, to power the aircraft.

The working medium gases are burned with the fuel in a combustion chamber. The combustion chamber provides a combustion zone for the gases and shields the interior of the engine from radiation heat transfer from the gases. One typical example of such a combustion chamber is shown in U.S. Pat. No.: 4,870,818 entitled Fuel Nozzle Guide Structure and Retainer for a Gas Turbine Engine issued to William G. Suliga, and assigned to the assignee of the present invention.

In Suliga, the combustion chamber includes an inner liner 14 and an outer liner 16. A dome-shaped head assembly 18 extends circumferentially about the upstream end of the combustion chamber. The head includes a circumferentially extending dome 20 which is a major element of the combustion chamber. The dome has a plurality of openings which adapt the combustion chamber to receive air from the compressor and to receive a fuel supply means such as a fuel nozzle. The head includes a generally planar bulkhead 28 which extends from the inner liner to the outer liner of the combustion chamber. The bulkhead has a plurality of openings, each associated with a corresponding opening in the dome, which permit a fuel nozzle to extend into the combustion chamber. Each opening in the bulkhead has a reference axis $A_b$.

The combustion chamber also includes minor elements such as a fuel nozzle guide 44. The fuel nozzle guide is disposed in an associated opening in the bulkhead. The fuel nozzle guide moves with the nozzle and slides with respect to the bulkhead to accommodate thermal growth of the components which might occur at different rates for the components. A hole through the guide adapts the guide to receive a fuel nozzle.

The fuel nozzle guide includes a heat shield 46 extending parallel to the bulkhead, that shields the bulkhead from the combustion zone. The fuel nozzle guide also has a member which extends axially from the heat shield to the upstream side of the bulkhead. A retainer ring 52 is attached to the upstream end of the fuel nozzle guide and slideably engages the upstream side of the bulkhead to axially trap the fuel nozzle guide on the bulkhead. A clearance gap is provided between the bulkhead and the fuel nozzle guide to allow for the slideable movement of the fuel nozzle with respect to the bulkhead. In particular, this slideable movement accommodates differences in thermal expansion between the bulkhead, the fuel nozzle (and of course the fuel nozzle guide), and the inner and outer liner during operative conditions of the engine.

Another embodiment of a combustion chamber is shown in U.S. Pat. No.: 4,934,145 entitled Combustor Bulkhead Heat Shield Assembly issued to Melvin H. Zeisser and assigned to the assignee of the present invention. A similar construction is shown in U.S. Pat. No.: 4,914,918 entitled Combustor Segmented Deflector issued to Dennis J. Sullivan and assigned to the assignee of the present invention.

In the Zeisser embodiment, the fuel nozzle guide 86 has a heat shield portion. The heat shield portion extends radially and parallel to the bulkhead, to form a cooling air plenum between the bulkhead and the fuel nozzle. A separate heat shield is disposed in the plenum. The separate heat shield: bounds a first passage having one closed end which extends between the heat shield and the bulkhead; and, bounds a second downstream passage having two open ends which extends between the heat shield and the fuel nozzle guide. These passages extend radially to duct cooling air through this region of the combustion chamber. Thus, the innermost end of the heat shield extends to seal the upstream radially extending passage from the plenum.

Accordingly, a plurality of cooling air holes 46 through the bulkhead are required to provide cooling air to the axially upstream passage. The holes in the bulkhead are sized to provide impingement cooling to the heat shield. The holes are angled toward the closed end of the upstream passage to direct the air radially inwardly. The flow of cooling air is ducted in the radially outward direction past the impingement jets to the perimeter of the heat shield and thence is exhausted into the combustion chamber. The axially downstream passage between the heat shield and the heat shield of the fuel nozzle guide is supplied with cooling air which is ducted through passages extending through the fuel nozzle guide.

The above art notwithstanding, scientists and engineers are seeking to develop bulkhead and fuel nozzle guide assemblies which provide for flexibility in design and duct cooling air to appropriate locations in the bulkhead assembly.

DISCLOSURE OF THE INVENTION

This invention is in part predicated on the recognition that supplying cooling air to a bulkhead and fuel nozzle guide assembly through impingement holes in the bulkhead has some inherent limitations. In particular it makes redesign of the cooling scheme difficult and any such redesign or modification will require replacement of a large assembly within the combustion chamber. It is also predicated on recognizing that present designs of fuel nozzle guide retainers block significant portions of the flow of cooling air into the vicinity of the fuel nozzle guide.

According to the present invention, a bulkhead and fuel nozzle guide assembly includes a fuel nozzle guide which is both spaced axially from the bulkhead to form a radially oriented plenum and is spaced radially inwardly from the bulkhead to provide a first annular supply gap for the plenum, the assembly further including a heat shield disposed in the plenum and in the supply gap to form a pair of axially spaced cooling air passages therebetween which extend radially outwardly from the gap and which each receive cooling air directly from annular orifices in the supply gap that are bounded by the heat shield.

In accordance with one detailed embodiment of the present invention, the bulkhead and fuel nozzle guide assembly includes a nozzle guide retainer which has a ring that slideably engages the surface of the bulkhead and which is spaced radially from the fuel nozzle guide leaving a second annular gap therebetween which is in direct flow communicatioxi with the first annular gap, the second annular gap being substantially free of blockage by structure which extends inwardly from the ring to support the fuel nozzle guide.

A primary feature of the present invention is a bulkhead and fuel nozzle guide assembly having a fuel nozzle guide which is adapted to receive the fuel nozzle. The fuel nozzle guide has a first member spaced axially from the bulkhead to leave a cooling air plenum therebetween. Another primary feature is a heat shield which is disposed in the cooling air plenum, dividing the cooling air plenum into a first passage and a second passage which extend radially away from the fuel nozzle guide. Another feature is a second member on the fuel nozzle guide which is spaced radially from the bulkhead. The heat shield extends into the radial gap between the bulkhead and the fuel nozzle guide to divide the gap into a first annular orifice and a second annular orifice. In one detailed embodiment, the radial width of the first annular orifice is varied to distribute the flow of cooling air to the passage between the heat shield and the bulkhead. A plurality of rails on the heat shield cooperate with the annular orifice to channel the cooling air to pre-selected locations between the heat shield and the bulkhead.

In one particular embodiment, a fuel nozzle guide retainer is disposed on the upstream side of the bulkhead. The retainer has a transversely extending outer ring. The retainer has an inner ring which is attached to the fuel nozzle guide. The inner ring is attached by struts to the outer ring. The outer ring is spaced radially from the fuel nozzle guide to provide a second annular gap. The second annular gap is in direct flow communication with the first annular gap. The second annular gap is substantially unobstructed by the support struts which extend from the outer ring.

A primary advantage of the present invention is the operational life of the combustion chamber and the ease of assembly of the fuel nozzle to the combustion chamber which results from the ability of the slideable fuel nozzle guide structure to accommodate differences in thermal growth between the bulkhead and the fuel nozzle guide. Another advantage is the service life of the bulkhead and fuel nozzle guide assembly which results from providing cooling air to the innermost locations of the heat shield, the fuel nozzle guide, and the bulkhead without employing impingement cooling for cooling passages extending through these components. An advantage is the level of flow of cooling air through a nozzle guide retainer which minimally blocks flow while providing adequate support to the fuel nozzle guide from the bulkhead. Another advantage is the ability to easily modify the cooling scheme by replacing minor elements of the combustion chamber, such as the heat shield, in comparison to configurations which use impingement cooling through the bulkhead and which require redesign or replacement of the bulkhead of the combustion chamber to change the cooling scheme.

The foregoing features and advantages of the present invention will become more apparent in the light of the following detailed description of the best mode for carrying out the invention and the accompanying drawing.

BEST MODE FOR CARRYING OUT THE INVENTION

Figure 1:
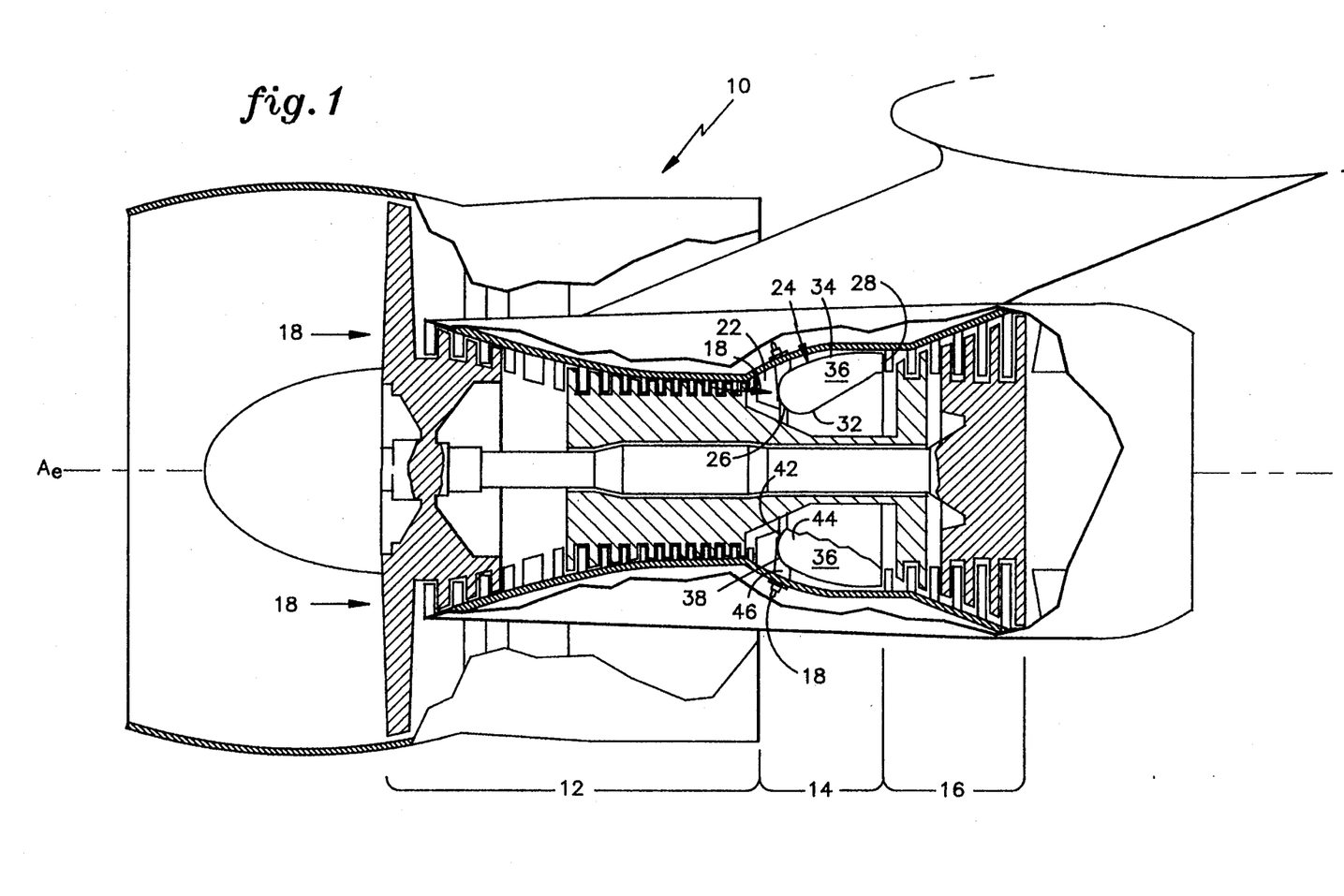
FIG. 1 is a side elevation, schematic view of a power plant for an aircraft and shows a portion of the wing of the aircraft, a pylon extending from the wing, a nacelle and a gas turbine engine disposed in the nacelle.

FIG. 1 is a schematic representation of an axial flow, rotary machine, such as a gas turbine engine 10. The engine includes a compression section 12 a combustion section 14, and a turbine section 16. The sections are disposed about are axis $A_e$ of the engine. A flow path for working medium gases 18 extends axially through these sections of the engine.

The combustion section includes a plenum 22 for working medium gases which are received from the compression section. The plenum extends circumferentially about the axis $A_e$ of the engine. An annular combustion chamber 24 is disposed in the plenum. The combustion chamber has an upstream end 26 and a downstream end 28.

The combustion chamber 24 includes an inner liner 32 which extends circumferentially about the axis $A_e$ of the engine. An outer liner 34 is spaced radially from the inner liner leaving a combustion zone 36 therebetween. The combustion zone is disposed between the upstream end and the downstream end.

The annular combustion chamber 24 includes an annular combustor head 38 at the upstream end of the combustion chamber. The combustor head includes a circumferentially extending dome 42 and a radially extending bulkhead (not shown) which is spaced axially from the dome, leaving a supply region 44 for supplying air to the combustion zone. A plurality of fuel nozzles 46 are spaced circumferentially about the interior of the engine. Each fuel nozzle extends into the combustor head and through the bulkhead to deliver fuel to the combustion zone on the interior of the combustion chamber.

Figure 2:
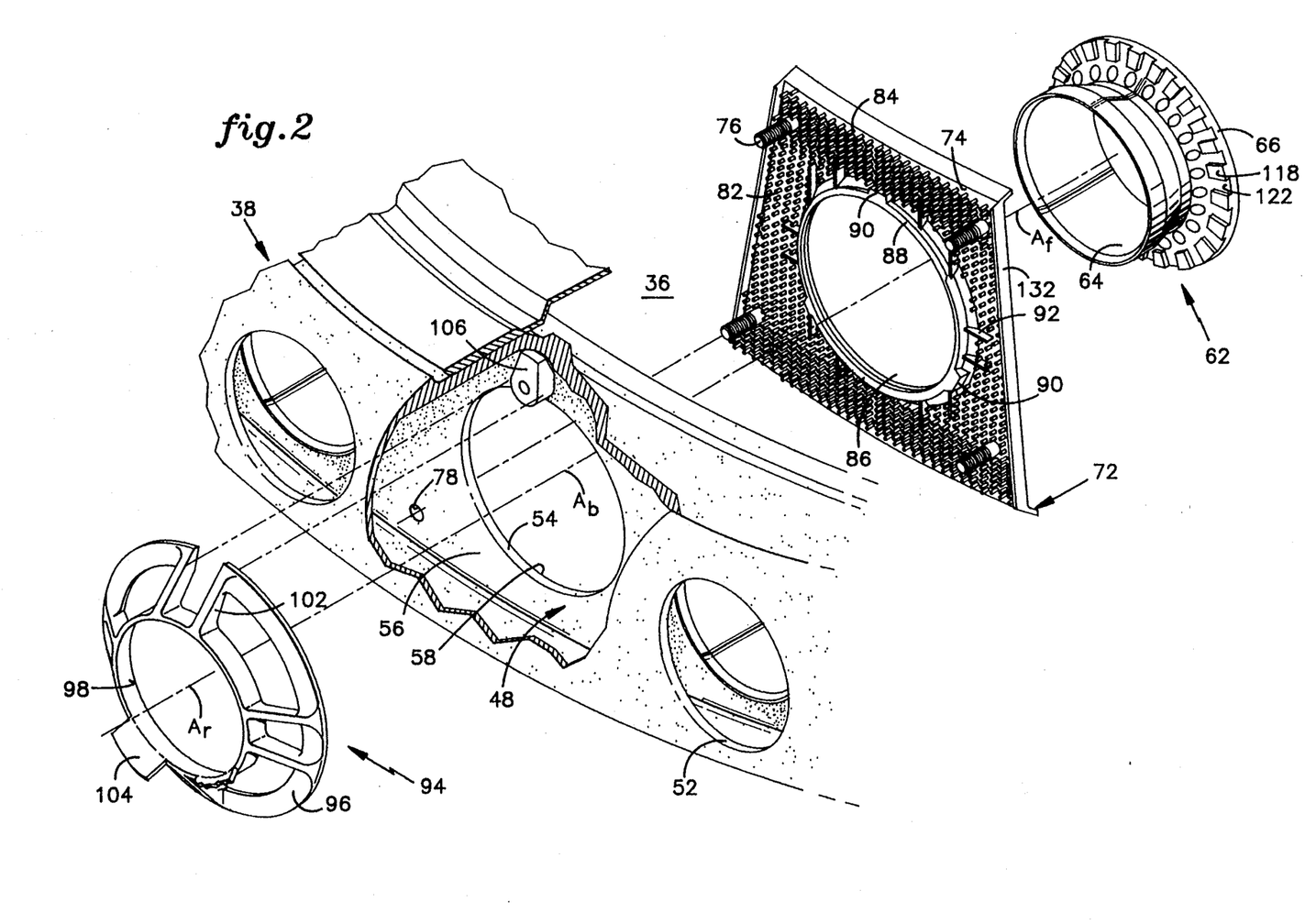
FIG. 2 is an exploded view of a portion of the combustion chamber of the engine shown in FIG. 1 and shows the relationship of a fuel nozzle guide, a fuel nozzle guide retainer, and a heat shield to a bulkhead in the combustion chamber.

FIG. 2 is an exploded view of the combustor head 38 shown in FIG. 1. The combustor head is partially broken away to show the relationship of several components which are disposed adjacent to each fuel nozzle 46 and which supply cooling air to the region adjacent the bulkhead 48. After cooling, the air is supplied to the combustion zone 36. The combustor head has a plurality of circumferentially spaced openings 52 in the dome and openings 54 in the bulkhead. The openings in the bulkhead are axially aligned with the openings in the dome for permitting insertion of the fuel nozzles into the combustion chamber. Each opening in the bulkhead has an axis $A_b$ and the bulkhead has an upstream surface 56 and a downstream surface 58.

A plurality of fuel nozzle guides, as represented by the fuel nozzle guide 62, are each disposed in an associated opening in the bulkhead 48 about an axis $A_f$. Each guide has an axially extending hole 64 through the guide which adapts the guide to receive an associated fuel nozzle. The guide includes a first member 66 which extends radially from the guide and a second member 68 disposed circumferentially about the hole in the guide. The second member extends radially upstream from the first member and through the bulkhead to provide an attachment point upstream of the bulkhead.

A plurality of heat shields 72 are disposed about the interior of the combustion chamber. Each heat shield abuts circumferentially the adjacent heat shields to form a heat shield assembly. The heat shield assembly extends about the interior of the combustion chamber downstream of the bulkhead. Each heat shield is disposed between fuel nozzle guide 62 and the bulkhead 48. The heat shield includes a first, generally planar element 74 which extends transversely with respect to the bulkhead. The planar element has four bolt-like members 76 extending axially from the planar element. The members adapt the heat shield to engage corresponding holes in the bulkhead as represented by the hole shown 78. The planar element includes a plurality of pin-like pedestals of varying height as represented by the short pedestals 82 and the long pedestals 84.

The planar element 74 has a hole 86 for receiving the second member of the fuel nozzle guide. A lip 88 extends axially from the first element and circumferentially about the hole in the first element. The lip has a plurality of projections 90 which extend from the lip and have a varying radial width. A plurality of ribs 92 extend outwardly from the lip in the central region of the planar element.

A retainer 94 for the nozzle guide, or nozzle guide retainer, is disposed on the upstream side of the bulkhead 48. The retainer has an axis $A_r$. The nozzle guide retainer includes an outer transverse ring 96 which extends axially and an inner cylindrical ring 98 which extends radially. A plurality of struts 102 extend from the axial ring to the cylindrical ring to support the cylindrical ring from the axial ring. A plurality of tabs, as represented by the tab 104, extend from the cylindrical member and adapt the cylindrical member to guide the fuel nozzle during insertion of the nozzle. The bulkhead includes a local circumferential stop 106 for oftenting the fuel nozzle retainer and for preventing circumferential movement of the fuel nozzle retainer.

Figure 3:
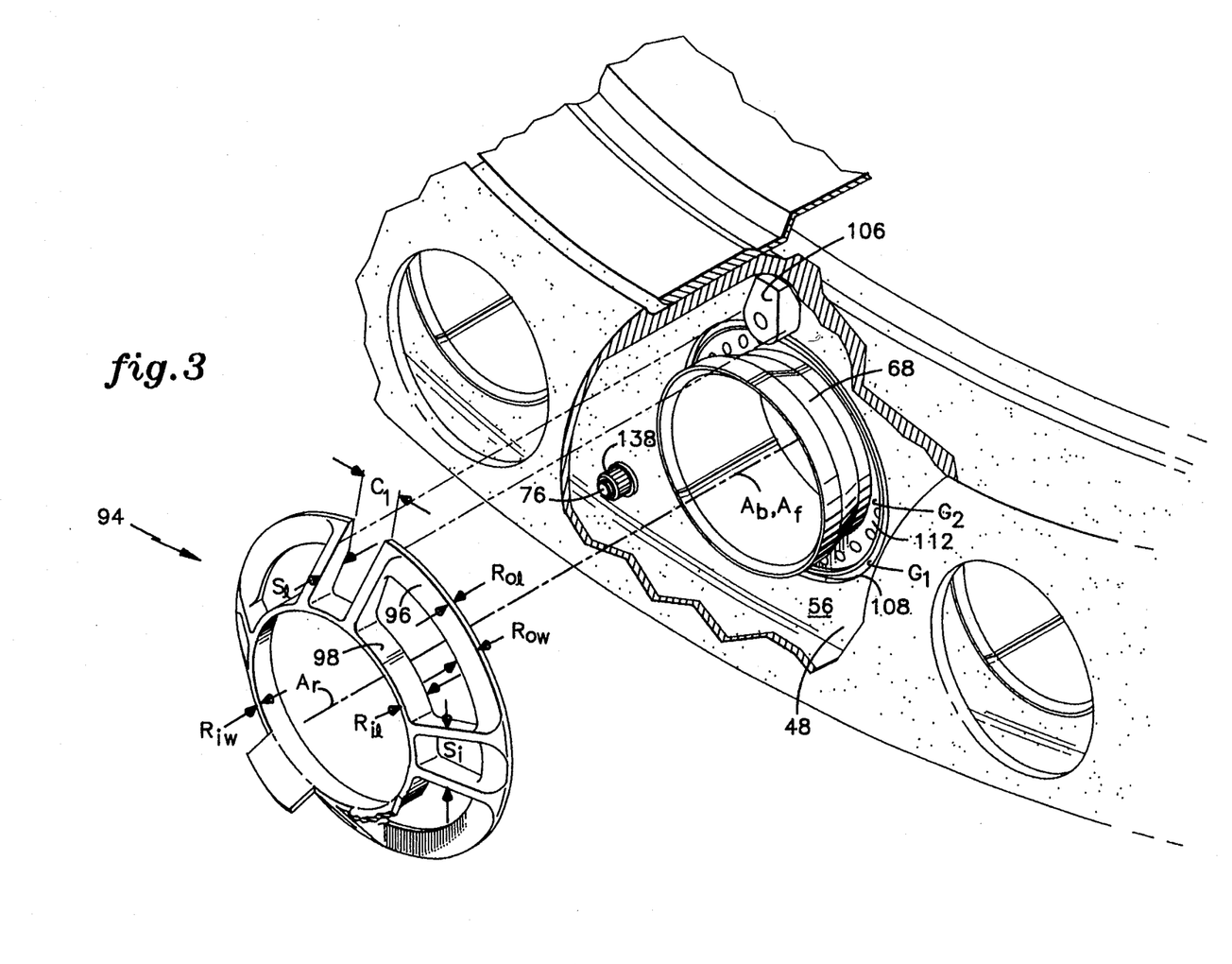
FIG. 3 is a partially exploded view corresponding to the view taken in FIG. 2.

FIG. 3 shows a partially assembled view of the assembly of the bulkhead 48 and fuel nozzle guide 62 shown in FIG. 2. The second member 68 of the fuel nozzle guide is spaced radially by a distance $G_1$ from the bulkhead. The lip 88 of the heat shield extends into the annular gap $G_1$ between the bulkhead and the fuel nozzle guide. This leaves a first orifice 108 and a second orifice 112 for cooling air disposed in this region. The heat shield is fixed to the bulkhead to fix the size of the first orifice 108. The bolt-like members, as represented by the member shown, extend through the bulkhead and are attached to the bulkhead by a suitable fastener such as a bolt to provide one example of means for attaching the heat shield.

The nozzle guide retainer 94 faces the upstream surface of the bulkhead 56. The axis $A_r$ of the retainer is coincident with the axis $A_b$ of the hole in the bulkhead. The inner ring 98 of the retainer has an axial length $R_{il}$ and a radial width $R_{iw}$. The axial length $R_{il}$ is at least three times greater than the radial width $R_{iw}$. The outer ring 96 is spaced axially from the inner ring in the downstream direction. It is also spaced radially outwardly from the inner ring. The outer ring adapts the fuel nozzle guide retainer to slideably engage the upstream surface of the bulkhead. The outer ring has an radial width $R_{ow}$ and an axial length $R_{ol}$. The radial width $R_{ow}$ is at least three times greater than the axially length $R_{ol}$.

A plurality of strut assemblies 114 extend between the inner ring 98 and the outer ring 96. The strut assemblies are each integral with the inner ring and the outer ring. The strut assemblies are spaced circumferentially about the nozzle retainer ring. Each strut assembly has at least one strut 102 and in the embodiment shown, three of the strut assemblies have two struts which are spaced circumferentially by a distance $S_c$. A pair of the struts having a circular width $C_1$ adapt the nozzle guide retainer to radially slide and slideably engage the stop 106 which is attached to the upstream face of the bulkhead. This permits relative radial movement of the bulkhead 48 with respect to the nozzle guide retainer 94 but restrains the nozzle guide retainer from circumferential movement with respect to the bulkhead. The inner ring 98 and the strut assemblies 114 are designed to present a very low frontal profile in the upstream direction to oncoming flow. As measured at the mid-point of the strut assembly between the inner ring and the outer ring, each strut has an axial length $S_l$ and a circumferential width $S_w$. The axial length $S_l$ is at least three times greater than the circumferential width $S_w$.

Figure 4:
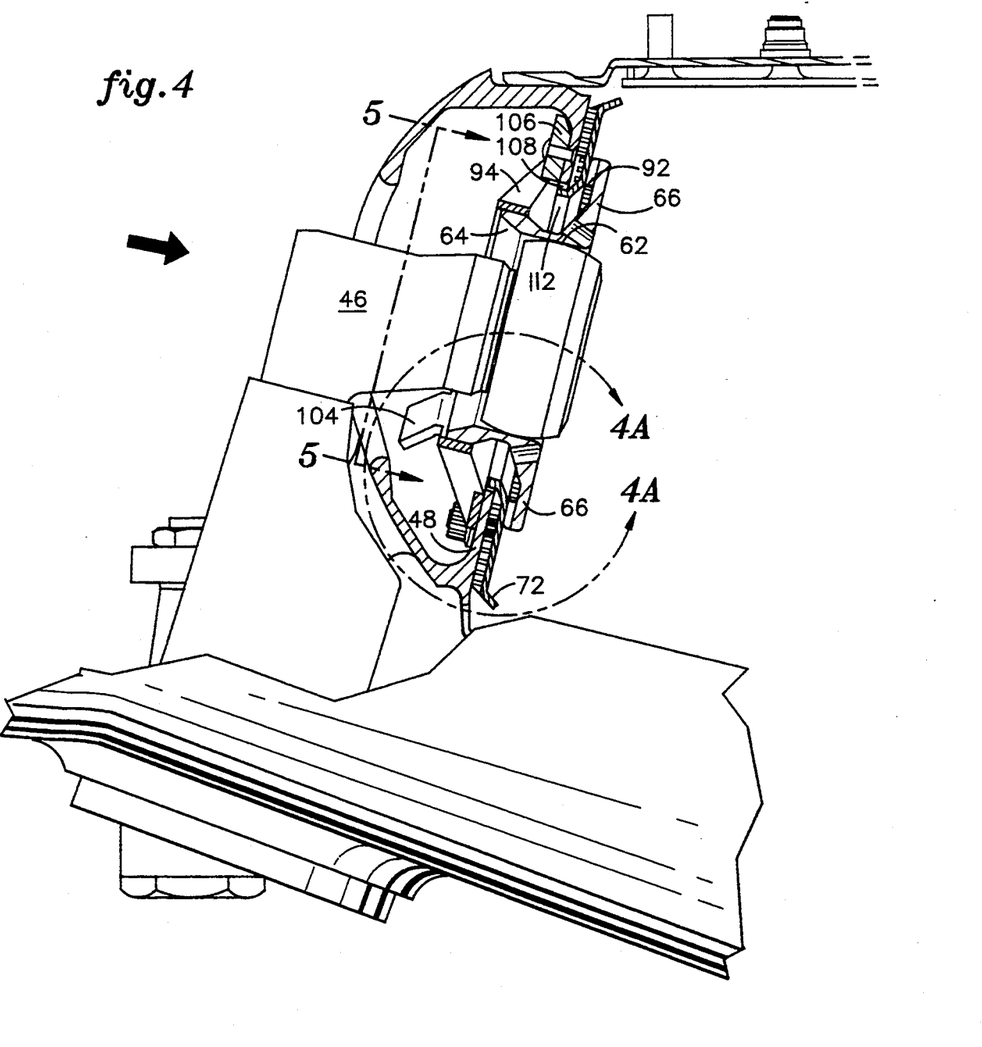
FIG. 4 is a side-elevation view of a portion of the combustion chamber shown in FIG. 2 and FIG. 3 which is partly in section, partly in full, and broken away for clarity to show a fuel nozzle and a portion of the combustion chamber assembly.

FIG. 4 is an assembled view of the fuel nozzle guide 62, heat shield 72, and nozzle guide retainer 94 shown in FIG. 2 and FIG. 3. FIG. 4 shows the relationship of these components to the fuel nozzle 46 and the circumferential stop 106. As can be seen, the tabs 104 of the retainer provide a guide for the nozzle as the nozzle enters the hole 64 in the fuel nozzle guide.

Figure 4A:
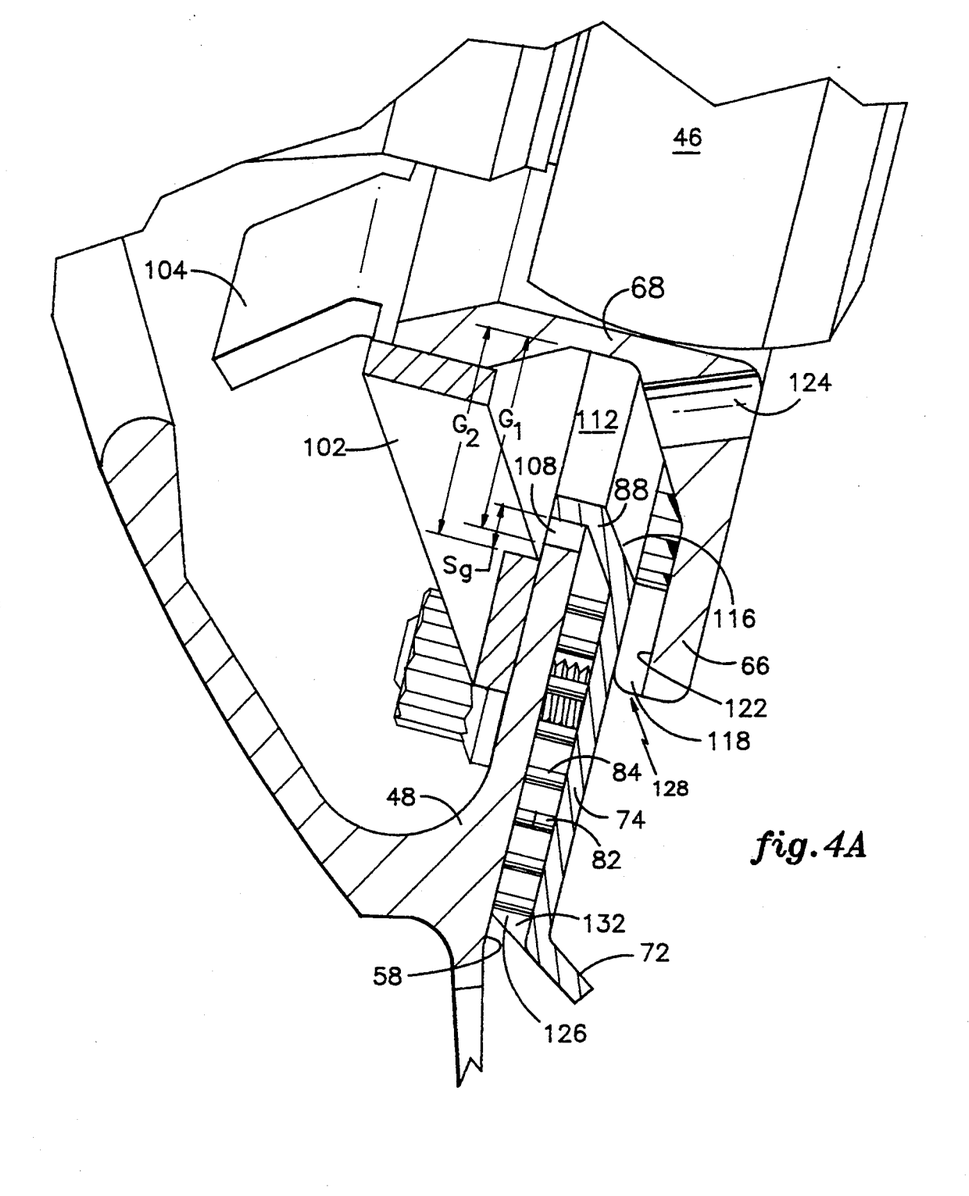
FIG. 4A is an enlarged portion of the view shown in FIG. 4 showing in more detail the relationship of the fuel nozzle guide, the fuel nozzle guide retainer, the bulkhead, and the heat shield which is disposed between the bulkhead and fuel nozzle guide.

FIG. 4A is an enlarged view of a portion of FIG. 4 taken along the lines 4A—4A of FIG. 4. The first member 66 of the fuel nozzle guide 62 extends radially from the guide to shield the bulkhead 48 from the combustion zone 36. The first member is spaced axially downstream from the bulkhead leaving a radially oriented plenum 116 for cooling air therebetween. A plurality of radially extending lands 118 extend axially into the plenum in the upstream direction leaving a groove 122 between each pair of lands. A plurality of axially oriented holes extend through the first member at a location radially inwardly of the lands.

The second member 68 of the fuel nozzle guide extends radially upstream from the first member 66 past the bulkhead 48 to adapt the guide to engage the fuel nozzle guide retainer 94. The second member is spaced radially inwardly from the bulkhead leaving the first annular gap $G_1$ therebetween. The first annular gap $G_1$ is immediately adjacent to the plenum 116 for supplying cooling air directly to the plenum.

The heat shield 72 is disposed in the radially oriented cooling air plenum 116 and extends into the first annular gap $G_1$ between the bulkhead 48 and the fuel nozzle guide 62. The heat shield includes the first, generally planar element 74. The planar element is disposed in the plenum and is spaced axially from the downstream surface 58 of the bulkhead to form a first radially extending passage 126 for cooling air therebetween. The planar element is spaced axially from the first member 66 of the fuel nozzle guide 62 and slideably engages the lands 118 to form a second radially extending passage 128 for cooling air therebetween. The second passage 128 is downstream of the first passage 126 for cooling air. The second annular passage is divided by the lands and extends through the grooves 122 between the lands.

The lip 88 on the heat shield 72 extends axially from the first planar element 74. The lip is disposed in the first annular gap $G_1$. The lip divides the first annular gap $G_1$ into the first annular supply orifice 108 for directly supplying cooling air to the first passage 126 and the second annular supply orifice 112 for directly supplying cooling air to the second passage 128. The second plurality of pedestals 84 of the planar element are illustrated. These pedestals have an axial height which is greater than the axial height of the first plurality of pedestals 82. The second plurality of pedestals extend from the planar element to slideably engage the downstream surface 58 of the bulkhead. The edge 132 of the heat shield is shown in the background.

In FIG. 4, a portion of the first plurality of pedestals and the edge are broken away to show one of the plurality of ribs 92 which extends from a region adjacent to the first orifice 108 into the pedestals. The rib does not extend beyond the radial extent of the first member 66 of the fuel nozzle guide. As a result, the fuel nozzle guide shields the location of the ribs from hot combustion gases which are axially downstream of the fuel nozzle guide.

The nozzle guide retainer 94 faces the upstream surface 56 of the bulkhead 48. The retainer axis $A_r$ is coincident with the axis $A_b$ of the hole in the bulkhead. The inner ring 98 of the retainer is integrally attached to the fuel nozzle guide 62. The outer ring 96 of the nozzle guide retainer slideably engages the upstream surface 56 of the bulkhead.

The outer ring 96 is spaced radially outwardly from the inner ring 98 and from the second member 68 of the fuel nozzle guide, leaving a second annular gap $G_2$ therebetween. The second annular gap $G_2$ is in direct flow communication with the first orifice 108 and second orifice 112. The flow communication is direct because the second annular gap $G_2$ is immediately adjacent the entrance to the first and second orifices.

The plurality of strut assemblies 114 extend between the inner ring 98 and the outer ring 96 and are represented by the single strut 102 that is shown. As mentioned above, each strut has an axial length $S_1$ and a circumferential width $S_w$ as measured at the radial midpoint between the inner ring and the outer ring. Each strut is disposed with respect to the second annular gap $G_2$ such that the strut extends radially into the second annular gap $G_2$ a distance $S_g$ which is less than twice the axial height $R_{ol}$ of the outer ring. Accordingly, the second annular gap is nearly unobstructed with respect to flow entering the second annular gap.

Figure 5:
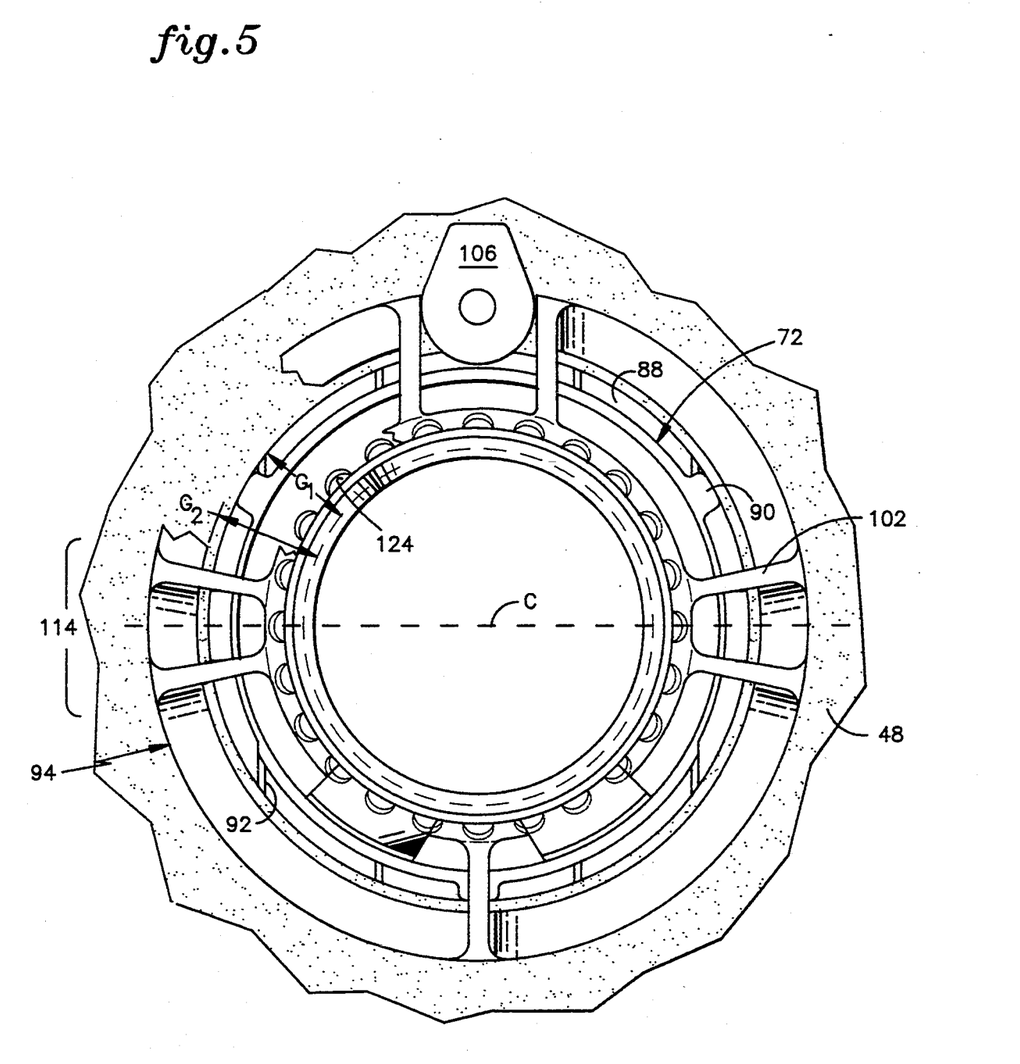
FIG. 5 is a view taken along the lines 5—5 of FIG. 4, with portions of the bulkhead and the fuel nozzle guide retainer broken away for clarity.

FIG. 5 is a view taken generally along the lines 5—5 of FIG. 4. The fuel nozzle 46 and a portion of the fuel guide retainer 94 are broken away to show the relationship of the lip 88 on the heat shield 72 to the first annular gap $G_1$ and the relationship of the fuel guide retainer 94 to the second annular gap $G_2$. As mentioned earlier, not only do the struts 102 present a diminished profile in the axial direction to oncoming flow, but also extend only to a minimal extent $S_g$ into the second annular gap $G_2$. This is important because the second annular gap $G_2$ is directly in flow communication with the first orifice 108 and the second orifice 112.

FIG. 5 also shows in greater detail the lip 88 on the heat shield 72 which divides the first annular gap $G_1$ into the first annular orifice 108 and the second annular orifice 112. The lip has the plurality of radially extending projections 90 or spacer elements which are disposed about the circumference of the lip. The spacer elements positively locate the heat shield in the radial direction with respect to the bulkhead 48 and space the remainder of the lip from the bulkhead to create the annular orifice 108. The lip is contoured radially to selectively vary the radial width of the first annular orifice. This contour is specially selected to distribute the flow of cooling air to needed areas of the heat shield. The ribs 92 on the heat shield extend to the lip to provide channels for ducting the metered cooling air to appropriate locations within the first annular passage.

The strut assemblies 114 are spaced circumferentially about the circumference of the nozzle guide retainer 94 at four nearly equally spaced locations; three of the strut assemblies are formed of pairs of struts 102. The strut assembly slideably engages the circumferential stop on the bulkhead in the radial direction and in the axial direction. The outer ring 96 is interrupted at that location to accommodate this engagement. The other two pairs of strut assemblies face each other along the cut line C. Cutting the retainer at this location divides the ring into two halves for easy insertion into the openings 52 in the bulkhead. Upon insertion, the two halves are joined together either directly or by being joined to the fuel nozzle guide.

During assembly, the heat shield 72 is inserted into the bulkhead 48 with the four post-like bolt members 76 extending through corresponding holes 78 in the bulkhead. Fasteners, such as the nuts 138, are attached to the bolts to securely attach the heat shield to the bulkhead with the first plurality of pedestals and ribs being urged against the bulkhead by the fasteners. In other embodiments, these ribs or pedestals might be spaced slightly from the bulkhead as are the first plurality of pedestals 82. The spacer elements 90 on the lip of the heat shield precisely locate the lip with respect to the bulkhead to establish the first orifice 108 and second orifice 112. The fuel nozzle guide 62 is then inserted though the bulkhead to the upstream side 56 of the bulkhead. The nozzle guide retainer 94 is integrally attached to the fuel nozzle guide by welding, bonding, or mechanical means.

The slideable engagement between the fuel nozzle retainer 94 and the bulkhead 48 and the fuel nozzle guide and the heat shield 72 enables the fuel nozzle guide assembly to slideably accommodate differences in thermal growth between the bulkhead structure and adjacent structure during operative conditions. It also allows the structure to accommodate any slight alignment adjustments of the fuel nozzle 46 during the installation process.

Slideable movement of the guide with respect to the heat shield does not disrupt cooling flow to the second radial passage 128. The size of the second annular orifice 112 is much greater than the first annular orifice. This enables the fuel nozzle guide to move within the diameter of the lip 88 on the heat shield and not change the effective flow area of the second annular orifice. This occurs even though the radial width of the orifice will change locally—for example, growing smaller as the fuel nozzle guide moves to one side—because a corresponding gap opens on the other side. The size of the second annular orifice avoids any maldistribution of flow which might occur even though a locally small gap is adjacent to the lip.

The first annular orifice 108 is precisely contoured and fixed such that cooling air is distributed to the necessary locations and in amounts that are appropriate. Over-cooling one location may cause thermal stresses to arise in the planar element which shields the bulkhead from the hot working medium gases in the combustion zone. The pre-determined distribution of flow in the present construction is aided by the use of pedestals and ribs in connection with the metering orifice and by fixing the radial position of the heat shield with spacers 90, bolt-like members 76 or both spacers and bolt-like members as shown in FIG. 2.

A particular advantage of the present invention is the location of the annular gap $G_1$ at the inner most portion of the first and second cooling air passages. The cooling air flow is distributed to the inner most portion of the first passage and the second passage and flows radially outwardly, in pre-determined flow patterns. This positively provides cooling flow to the inner most locations without impingement jets disrupting the flow patterns which extend radially outward. And, the absence of impingement cooling through the bulkhead allows more precise calculation of the flow patterns leading to a better cooling scheme than constructions having impingement jets which extend into the flow patterns.

This construction has a plentiful supply of cooling air to this critical location of the fuel nozzle guide assembly. The plentiful supply is made possible, in part, by the nearly unobstructed second annular gap $G_2$ which extends between the fuel nozzle guide retainer 94 and the fuel nozzle guide 62. The obstruction of the struts 102 extending into the second annular gap $O_2$ results in an obstruction which is less than ten percent (10%) and in one embodiment is five percent (5%) of flow area of the second annular gap. Over ninety percent [and in one embodiment, over ninety-five percent (95%)] of the flow area of the second annular gap is available to duct cooling air into the first annular orifice 108. Accordingly, the presence of the retainer has a minimal impact on flow in the gap $G_2$ and the gap is substantially unobstructed to the flow of cooling air. In addition, the strut assemblies are narrow in the circumferential direction and long in the axial direction presenting a low profile obstruction to flow passing from the supply region into the second annular gap.

The design of the nozzle guide retainer has a lower surface area to volume than do earlier designed retainers; this makes the device a readily castable article, and a material, such as Hastaloy X (Aerospace Material Specification 5646) may be used. This enables a lightweight, open construction for the fuel nozzle guide retainer while providing sufficient strength to the construction.

A significant advantage of the present construction is the ease with which modifications may be made to the cooling flow pattern by merely changing the contour of the lip or the size or the circumferential extent of the spacers. This enables retrofitting improved designs which may solve problems experienced during the long operative life of the engine. In the past, this was difficult to accomplish without changing a major assembly such as the bulkhead because it required redistribution of the impingement cooling holes in the bulkhead.

Another advantage of the present construction is shielding provided to the heat shield 72 by the fuel nozzle guide 62. The radial extent of the first member 66 of a fuel nozzle guide extends a distance which is at least equal to or greater than the extent of the ribs 92 on the heat shield. This reduces the possibility of cracking the heat shield at these locations and provides for increased durability in comparison to constructions where the ribs extend beyond the protected portion of the heat shield.

Although this invention has been shown and described with respect to detailed embodiments thereof, it will be understood by those skilled in the art that various changes, omissions and additions in form and detail thereof may be made without departing from the spirit and scope of the claimed invention. I claim:

In the claims:

1. A bulkhead and fuel nozzle guide assembly for an annular combustion chamber having an upstream end, a downstream end, an inner liner, an outer liner spaced radially from the inner liner leaving an annular combustion zone therebetween which is disposed between the ends, and having an annular combustor head at the upstream end which has a supply region for supplying air to the combustion zone, the head including a radially extending bulkhead which bounds the supply region on the downstream end, the bulkhead having an upstream surface, a downstream surface and a plurality of openings spaced circumferentially about the bulkhead which extend through the upstream surface and the downstream surface, each opening having an axis $A_b$ and adapting the bulkhead to receive a fuel nozzle, which comprises:

a plurality of fuel nozzle guides, each guide being disposed in an associated opening in the bulkhead, the guide having an axially extending hole through the guide which is disposed about an axis Af and which adapts the guide to receive an associated fuel nozzle, the guide being spaced axially downstream from the bulkhead leaving a radially oriented plenum for cooling air therebetween and extending radially upstream from the first member past the bulkhead to adapt the guide to engage a fuel nozzle guide retainer and being spaced radially inwardly from the bulkhead leaving a first annular supply gap therebetween for supplying cooling air to the cooling air plenum;

a heat shield at each opening which abuts circumferentially with the circumferentially adjacent heat shields to form a heat shield assembly, each heat shield being disposed in the radially oriented cooling air plenum and the first annular supply gap between the bulkhead and the fuel nozzle guide, the heat shield being disposed in the plenum and spaced axially from the downstream surface of the bulkhead to form a first radially extending passage for cooling air therebetween, and being spaced axially from the first member of the nozzle guide to form a second radially extending passage for cooling air therebetween downstream of the first passage for cooling air, and, having a lip extending axially which is disposed in the annular gap to divide the annular gap into a first annular supply orifice for directly supplying cooling air to the first passage and a Second annular supply orifice for directly supplying cooling air to the second passage; and;

a nozzle guide retainer facing the upstream surface of the bulkhead, the retainer having an axis $A_r$ which is coincident with the axis $A_f$ of the hole in the fuel nozzle guide;

wherein the fuel nozzle retainer is integrally joined to the fuel nozzle guide and traps the assembly in the axial direction to the bulkhead, and wherein the supply region is in flow communication with the second annular gap and flow through the gap is metered through the orifices to the cooling passages without the use of impingement holes in the bulkhead to cool the heat shield assembly under operative conditions of the combustion chamber.

2. The bulkhead and guide assembly as claimed in claim 1 wherein the lip is contoured radially to selectively vary the radial width of the first annular orifice.

3. The bulkhead and guide assembly as claimed in claim 2 wherein the lip of the heat shield has a plurality of radially extending spacer elements disposed about the circumference of the lip, the spacer elements positively locating the heat shield in the radial direction with respect to the bulkhead, and spacing a portion of the lip from the bulkhead.

4. The bulkhead and guide assembly as claimed in claim 3 wherein the heat shield further has a first planar element disposed in the plenum and spaced axially from the bulkhead and the fuel nozzle guide, the planar element having a first plurality of pedestals and a second plurality of pedestals which each have an axial height and extend radially from the planar element toward the bulkhead into the first radial passage, the second plurality of pedestals having an axial height which is greater than the axial height of the first plurality of pedestals, and having a plurality of ribs extending from the first orifice into the pluralities of pins to guide the flow into the arrays of pins.

5. The bulkhead and guide assembly as claimed in claim 4 wherein the fuel nozzle guide has a first member spaced axially from the heat shield and bounding the second passage for cooling air, and wherein the ribs have a radial extent which is less than or equal to the radial extent of the first member of the fuel nozzle guide such that the first member shields the location of the ribs in the axial downstream direction from hot gases in the combustion zone.

6. The bulkhead and guide assembly as claimed in claim 1 wherein the nozzle guide retainer has an inner ring which is cylindrical in shape and which extends circumferentially about the axis $A_r$ leaving an opening therein which adapts the retainer to receive the fuel nozzle guide, the inner ring having an axial length $R_{il}$ and a radial width $R_{iw}$, the axial length $R_{il}$ being at least three times greater than the radial width $R_{iw}$ and the nozzle guide retainer has an outer ring which is spaced axially from the inner ring in the downstream direction which is spaced radially outwardly from the inner ring and from the second member leaving a second annular gap therebetween which is in direct flow communication with the first and second orifices, the outer ring slidably engaging the upstream surface of the bulkhead and having an a radial width $R_{ow}$ and an axial length $R_{ol}$, the radial width $R_{ow}$ being at least three times greater than the axial length $R_{ol}$, and, the nozzle guide retainer has a plurality of strut assemblies extending between the inner ring and the outer ring, and integral with the inner ring and the outer ring, and being spaced circumferentially about the nozzle retainer ring, each strut assembly having at least one strut, each strut having an axial length $S_l$ and a circumferential width $S_w$ as measured at the radial midpoint between the inner ring and the outer ring, the axial length $S_l$ being at least three times greater than the circumferential width $S_w$ such that the nozzle guide retainer presents a narrow profile to the oncoming flow.

7. The bulkhead and guide assembly as claimed in claim 6 wherein each strut is disposed with respect to the second annular gap such that the strut extends radially into the second radial gap a distance $S_g$ which is less than twice the axial length $R_{ol}$ of the outer ring and wherein the blockage of the second annular gap by the struts extending into the second annular gap is less than ten percent of the cross sectional flow area.

8. A bulkhead and fuel nozzle guide assembly for an annular combustion chamber having an upstream end, a downstream end, an inner liner, an outer liner spaced radially from the inner liner leaving an annular combustion zone therebetween which is disposed between the ends, and having an annular combustor head at the upstream end which has a supply region for supplying air to the combustion zone, the head including a radially extending bulkhead which bounds the supply region on the downstream end, the bulkhead having an upstream surface, a downstream surface and a plurality of openings spaced circumferentially about the bulkhead which extend through the upstream surface and the downstream surface, each opening having an axis $A_b$ and adapting the bulkhead to receive a fuel nozzle, which comprises:

a plurality of fuel nozzle guides, each guide being disposed in an associated opening in the bulkhead, the guide having an axially extending hole through the guide which is disposed about an axis $A_f$ and which adapts the guide to receive an associated fuel nozzle, the guide further including;

a first member which extends radially from the guide to shield the bulkhead from the combustion zone, which is spaced axially downstream from the bulkhead leaving a radially oriented plenum for cooling air therebetween and a plurality of radially extending lands which extend axially into the plenum leaving a groove between each pair of lands, the first member further including a plurality of axially oriented holes which extend through the first member at a location radially inwardly of the lands, and;

a second member disposed circumferentially about the hole in the guide and extending radially upstream from the first member past the bulkhead to adapt the guide to engage a fuel nozzle guide retainer, the second member being spaced radially inwardly from the bulkhead leaving a first annular supply gap therebetween for supplying cooling air to the cooling air plenum;

a heat shield at each opening which abuts circumferentially with the circumferentially adjacent heat shields to form a heat shield assembly, each heat shield being disposed in the radially oriented cooling air plenum and the first annular supply gap between the bulkhead and the fuel nozzle guide, the heat shield including;

a first, generally planar element disposed in the plenum and spaced axially from the downstream surface of the bulkhead to form a first radially extending passage for cooling air therebetween, and spaced axially from the first member of the nozzle guide and slidably engaging the lands to form a second radially extending passage for cooling air therebetween downstream of the first passage for cooling air, the second annular passage being divided by the land and extending through the grooves between the lands, and;

a lip extending axially from the first element which is disposed in the annular gap to divide the annular gap into a first annular supply orifice for directly supplying cooling air to the first passage and a second annular supply orifice for directly supplying cooling air to the second passage, the lip having a plurality of radially extending spacer elements disposed about the circumference of the lip, the spacer elements positively locating the heat shield in the radial direction with respect to the bulkhead, and spacing a portion of the lip from the bulkhead, the lip being contoured radially to selectively vary the radial width of the first annular orifice;

a first plurality of pedestals and a second plurality of pedestals which each have an axial height and extend radially from the planar element toward the bulkhead into the first radial passage, the second plurality of pedestals having an axial height which is greater than the axial height of the first plurality of pedestals, and a plurality of ribs extending from the first orifice into the pluralities of pins to a radial extent which is less than or equal to the radial extent of the first member of the fuel nozzle guide such that the first member shields the location of the rib in the axial downstream direction;

a nozzle guide retainer facing the upstream surface of the bulkhead, the retainer having an axis $A_r$ which is coincident with the axis $A_f$ of the fuel nozzle guide, the nozzle guide retainer having;

an inner ring which is cylindrical in shape and which extends circumferentially about the axis $A_r$ leaving an opening therein which adapts the retainer to receive the second member of the fuel nozzle guide, the inner ring having an axial length $R_{il}$ and a radial width $R_{iw}$, the axial length $R_{il}$ being at least three times greater than the radial width $R_{iw}$;

an outer ring which is spaced axially from the inner ring in the downstream direction and which is spaced radially outwardly from the inner ring and from the second member leaving a second annular gap therebetween which is in direct flow communication with the first and second orifices, the outer ring slidably engaging the upstream surface of the bulkhead and having an a radial width $R_{ow}$ and an axial length $R_{ol}$, the radial width $R_{ow}$ being at least three times greater than the axial length $R_{ol}$, and;

a plurality of strut assemblies extending between the inner ring and the outer ring, and integral with the inner ring and the outer ring, and being spaced circumferentially about the nozzle retainer ring, each strut assembly having at least one strut, each strut having an axial length $S_1$ and a circumferential width $S_w$ as measured at the radial midpoint between the inner ring and the outer ring, the axial length $S_1$ being at least three times greater than the circumferential width $S_w$, each strut being disposed with respect to the second annular gap such that the strut extends radially into the second radial gap a distance $S_g$ which is less than twice the axial length $R_{ol}$ of the outer ring;

wherein the outer ring of the fuel nozzle retainer is integrally joined to the fuel nozzle guide and traps the assembly in the axial direction to the bulkhead, and wherein the blockage of the second annular gap by the struts extending into the second annular gap is less than five percent of the cross sectional flow area, and wherein the supply region is in flow communication with the second annular gap and flow through the gap is metered through the orifices to the cooling passages without the use of impingement holes to cool the bulkhead and heat shield under operative conditions of the combustion chamber.

9. A nozzle guide retainer for a bulkhead and fuel nozzle guide assembly for an annular combustion chamber having an upstream end, a downstream end, an inner liner, an outer liner spaced radially from the inner liner leaving an annular combustion zone therebetween which is disposed between the ends, and having an annular combustor head at the upstream end which has a supply region for supplying air to the combustion zone, the head including a radially extending bulkhead which bounds the supply region on the downstream end, the bulkhead having an upstream surface, a downstream surface and a plurality of openings spaced circumferentially about the bulkhead which extend through the upstream surface and the downstream surface, each opening having an axis $A_b$ and adapting the bulkhead to receive a fuel nozzle facing the upstream surface of the bulkhead, the retainer having an axis $A_r$ which is coincident with the axis $A_f$ of the fuel nozzle guide, the nozzle guide retainer comprising:

an inner ring which is cylindrical in shape and which extends circumferentially about the axis $A_r$ leaving an opening therein which adapts the retainer to be attached to a fuel nozzle guide, the inner ring having an axial length $R_{il}$ and a radial width $R_{iw}$, the axial length $R_{il}$ being at least three times greater than the radial width $R_{iw}$; and;

an outer ring which is spaced axially from the inner ring in the downstream direction and which is spaced radially outwardly from the inner ring and has a cylindrical opening, the outer ring being adapted to slidably engage the upstream surface of a bulkhead and having a radial width $R_{ow}$ and an axial length Rob the radial width $R_{ow}$ being at least three times greater than the axial length $R_{ol}$ and;

a plurality of strut assemblies extending between the inner ring and the outer ring, and integral with the inner ring and the outer ring, and being spaced circumferentially about the nozzle retainer ring, each strut assembly having at least one strut, each strut having an axial length $S_1$ and a circumferential width $S_w$ as measured at the radial midpoint between the inner ring and the outer ring, the axial length $S_1$ being at least three times greater than the circumferential width $S_w$;

wherein the outer ring of the fuel nozzle retainer is adapted to be integrally joined to a fuel nozzle guide through the struts and trap the assembly in the axial direction to the bulkhead, wherein the supply region is adapted to be in flow communication with the cylindrical opening, and wherein the struts present a reduced axial profile to the oncoming flow.

10. The nozzle guide retainer for a bulkhead and fuel nozzle guide assembly for an annular combustion chamber of claim 9 wherein each strut is disposed with respect to the cylindrical opening such that the strut extends radially into the cylindrical opening a distance $S_g$ which is less than twice the axial length $R_{ol}$ of the outer ring to avoid blockage of the opening.

* * * * *